(12) United States Patent
Kuo et al.

(10) Patent No.: US 12,529,844 B2
(45) Date of Patent: *Jan. 20, 2026

(54) APPARATUS FOR OPTICAL COUPLING (71) Applicant: Taiwan Semiconductor Manufacturing Company, Ltd., Hsinchu (TW)

(72) Inventors: Feng-Wei Kuo, Hsinchu County (TW); Chewn-Pu Jou, Hsinchu (TW)

(73) Assignee: Taiwan Semiconductor Manufacturing Company, Ltd., Hsinchu (TW)

(*) Notice: Subject to any disclaimer, the term of this patent is extended or adjusted under 35 U.S.C. 154(b) by 0 days.

This patent is subject to a terminal disclaimer.

(21) Appl. No.: 18/773,556

(22) Filed: Jul. 15, 2024

(65) Prior Publication Data

US 2024/0369762 A1  Nov. 7, 2024

Related U.S. Application Data (63) Continuation of application No. 18/360,820, filed on Jul. 28, 2023, now Pat. No. 12,105,324, which is a continuation of application No. 17/075,698, filed on Oct. 21, 2020, now Pat. No. 11,762,145.

(51) Int. Cl.
| | |
|---|---|
| G02B 6/293 | (2006.01) |
| F21V 8/00 | (2006.01) |
| G02B 6/12 | (2006.01) |
| G02B 6/122 | (2006.01) |
| G02B 6/14 | (2006.01) |
| G02B 6/30 | (2006.01) |

(52) U.S. Cl.
CPC ......... *G02B 6/1223* (2013.01); *G02B 6/0083* (2013.01); *G02B 6/12007* (2013.01); *G02B 6/14* (2013.01); *G02B 6/29325* (2013.01); *G02B 6/30* (2013.01)

(58) Field of Classification Search
CPC .......................... G02B 6/0083; G02B 6/29325
See application file for complete search history.

(56) References Cited

U.S. PATENT DOCUMENTS

| | | | |
|---|---|---|---|
| 9,091,827 B2* | 7/2015 | Verslegers | G02B 6/34 |
| 10,955,614 B1* | 3/2021 | Peng | H01L 22/34 |
| 2004/0156589 A1* | 8/2004 | Gunn, III | G02B 6/12004 385/37 |
| 2012/0224810 A1* | 9/2012 | Doerr | G02B 6/124 427/163.2 |
| 2014/0193115 A1* | 7/2014 | Popovic | G02B 6/124 385/14 |
| 2019/0121025 A1* | 4/2019 | Verslegers | G02B 5/1861 |

* cited by examiner

*Primary Examiner* — Eric Wong
(74) *Attorney, Agent, or Firm* — JCIPRNET (57) ABSTRACT

Disclosed are apparatuses for optical coupling and a system for communication. In one embodiment, an apparatus for optical coupling having an optical coupling region is disclosed. The apparatus for optical coupling includes a substrate and a core layer disposed on the substrate. The core layer includes a plurality of holes located in the optical coupling region. An effective refractive index of the core layer gradually decrease from a first end of the optical coupling region to a second end of the optical coupling region.

20 Claims, 6 Drawing Sheets

APPARATUS FOR OPTICAL COUPLING

CROSS-REFERENCE TO RELATED APPLICATION

This application is a continuation application of and claims the priority benefit of U.S. application Ser. No. 18/360,820, filed on Jul. 28, 2023, now allowed, which is a continuation application of and claims the priority benefit of U.S. application Ser. No. 17/075,698, filed on Oct. 21, 2020. The entirety of each of the above-mentioned patent applications is hereby incorporated by reference herein and made a part of this specification.

BACKGROUND

Optical gratings are frequently used to enable communication between light sources and other components (e.g., photodetectors). For example, optical gratings can be used to redirect light from an optical fiber into an optical detector. Light coupled from one end of the optical gratings that has been traveling transversely through the optical gratings by reflecting off the inner surfaces at shallow angles may be redirected so that it strikes the inner surfaces at a sharper angle that is greater than the critical angle of incidence, thus allowing the redirected light to escape from the other end of the optical gratings. After escaping, the light may impinge upon the optical detector. The detected light may then be used for various purposes, such as to receive an encoded communications signal that was transmitted through the optical gratings. Unfortunately, this process, as well as a reverse process in which optical gratings are used to redirect light from an on-chip light source to an optical fiber, may exhibit poor coupling efficiency, with a large part of the redirected light not reaching the optical detector. There exists a need to develop an apparatus and system of efficient optical coupling using optical gratings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, it will be understood that when an element is referred to as being "connected to" or "coupled to" another element, it may be directly connected to or coupled to the other element, or one or more intervening elements may be present. Further, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The coupling efficiency is the ratio of power that couples from the waveguide mode to the fiber mode (or vice versa) and can be calculated using $CE=(1-R)*\eta_d*\eta_{ov}$, wherein $\eta_d$ is the directionality, $\eta_{ov}$ is the optical field overlap, and R is the back reflection. Directionality $\eta_d$ measures a fraction of power that are diffracted upward. The optical field overlap $\eta_{ov}$ measures the overlap integral between the diffracted field profile and the Gaussian fiber mode, and the back reflection R measures a fraction of power reflected back into the input port. Therefore, in order to improve the coupling efficiency, one can improve the directionality, increase the overlap and use small refractive index contrast to reduce the back reflection. This disclosure presents various embodiments of an efficient fiber-to-chip grating coupler with high coupling efficiency.

In one embodiment, a disclosed grating coupler includes a core layer having a plurality of holes located in the optical coupling region of the grating coupler. An effective refractive index of the core layer gradually decrease from a first end of the optical coupling region to a second end of the optical coupling region, which helps to reduce the back reflection, and thus reduces fiber light loss at the optical input/output (I/O) device and improves the coupling efficiency of the grating coupler.

In addition, the height and angle of an optical fiber array coupled to the grating coupler may be adjusted to obtain a better grating coupling efficiency. Once an optimal or a desired input angle of the optical signals is determined, one can also design the structure of the grating coupler to ensure a good coupling efficiency. For example, metal layers above the core layer may be etched to form an optical channel that aligns with the optimal or desired input angle. This ensures that the optical signals received via the optical channel will have the optimal or desired input angle for the grating coupler to enjoy a good coupling efficiency.

The disclosed grating coupler has a high coupler efficiency and is easy to implement in any suited silicon photonics I/O and high speed applications. The disclosed grating coupler is convenient for wafer-scale testing as well as low-cost packaging.

Figure 1:
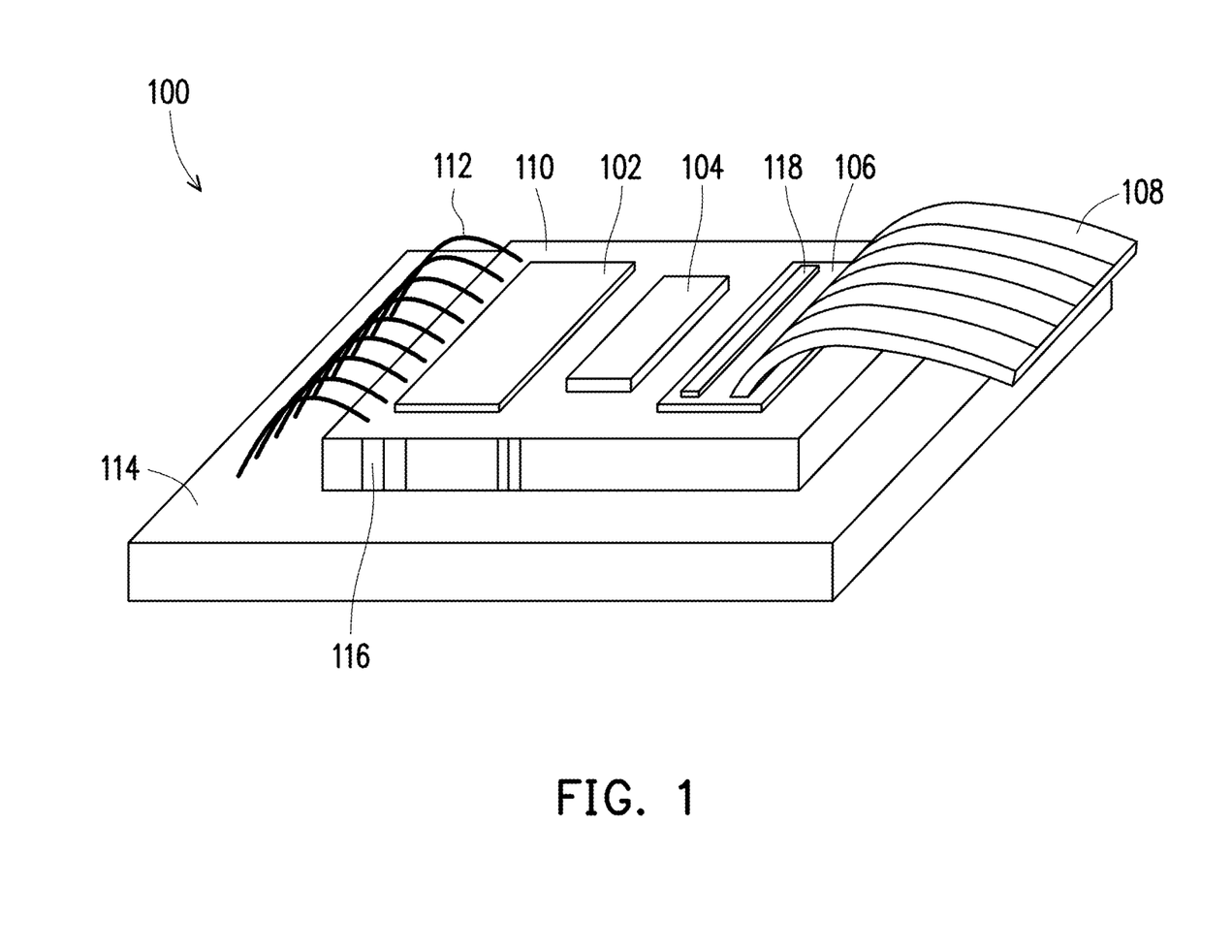
FIG. 1 illustrates an exemplary block diagram of an apparatus for optical coupling, in accordance with some embodiments of present disclosure.

FIG. 1 illustrates an exemplary block diagram of an apparatus 100 for optical coupling, in accordance with some embodiments of present disclosure. It is noted that the apparatus 100 for optical coupling is merely an example, and is not intended to limit the present disclosure. Accordingly, it is understood that additional functional blocks may be provided in or coupled to the apparatus 100 for optical coupling of FIG. 1, and that some other functional blocks may only be briefly described herein.

Referring to FIG. 1, the apparatus 100 for optical coupling includes an electronic die 102, a light source die 104, a photonic die 106, an interposer 110, and a printed circuit board (PCB) substrate 114. The electronic die 102, the light source die 104 and the photonic die 106 are coupled together through input/output interfaces (not shown) on the interposer 110. In some embodiments, the interposer 110 is fabricated using silicon. In some embodiments, the interposer 110 includes at least one of the following: interconnecting routing, through silicon via (TSV), and contact pads. In some embodiments, the interposer 110 is to integrate all components including the electronic die 102, the light source die 104, and the photonic die 106 together. In certain embodiments, each of the electronic die 102, the light source die 104, and the photonic die 106 are coupled to the interposer 110 using a flip-chip (controlled collapse chip connection, C4) interconnection method. In some embodiments, high density solder microbumps are used to couple the electronic die 102, the light source die 104, and the photonic die 106 to the interposer 110. Further, the interposer 110 is coupled to the PCB substrate 114 through wire bonding 112 or through silicon-vias (TSV) 116 using soldering balls. The TSVs 116 can include electrically conductive paths that extend vertically through the interposer 110 and provide electrical connection between the electronic die 102 and the PCB 114. In some embodiments, the PCB substrate 114 can include a support structure for the apparatus 100 for optical coupling, and can include both insulating and conductive materials for isolation devices as well as providing electrical contact for active devices on the photonic die 106 as well as circuits/devices on the electronic die 102 via the interposer 110. Further, the PCB substrate 114 can provide a thermally conductive path to carry away heat generated by devices and circuits in the electronic die 102 and the light source die 104.

In some embodiments, the electronic die 102 includes circuits (not shown) including amplifiers, control circuit, digital processing circuit, etc. The electronic die 102 further includes at least one electronic circuit (not shown) that provides the required electronic function of the apparatus 100 for optical coupling and driver circuits for controlling the light source die 104 or elements in the photonic die 106.

In some embodiments, the light source die 104 includes a plurality of components (not shown), such as at least one light emitting elements (e.g., a laser diode or a light-emitting diode), transmission elements, modulation elements, signal processing elements, switching circuits, amplifier, input/output coupler, and light sensing/detection circuits. In some embodiments, each of the at least one light-emitting elements in the light source die 104 can include solid-state inorganic, organic or a combination of inorganic/organic hybrid semiconducting materials to generate light. In some embodiments, the light source die 104 is on the photonic die 106.

In some embodiments, the photonic die 106 includes an optical fiber array 108, an optical interface, and a plurality of fiber-to-chip grating couplers 118. In some embodiments, the plurality of fiber-to-chip grating couplers 118 are configured to couple the light source die 104 and the optical fiber array 108. In some embodiments, the optical fiber array 108 includes a plurality of optical fibers and each of them can be a single-mode or a multi-mode optical fiber. In some embodiments, the optical fiber array 108 can be fixed on the photonic die 106 through adhesives (e.g., epoxy).

In some embodiments, the photonic die 106 further includes components (not shown) such as a laser driver, digital control circuit, photodetectors, waveguides, small form-factor pluggable (SFP) transceiver, high-speed phase modulator (HSPM), calibration circuit, distributed Mach-Zehnder interferometer (MZI), grating couplers, light sources, (i.e., laser), etc. Each of the plurality of fiber-to-chip grating coupler 118 enables the coupling of optical signals between the optical fiber array 108 and the light source die 104 or corresponding photodetectors on the photonic die 106. Each of the plurality of fiber-to-chip grating couplers 118 includes a plurality of gratings and a waveguide with designs to reduce refractive index contrast to reduce back reflection losses providing improved coupling efficiency between the optical fiber on the corresponding waveguide, which are discussed in details below in various embodiments of the present disclosure.

During operation, optical signals received from a remote server attached on one end of the optical fiber array 108 can be coupled through the fiber-to-chip grating couplers 118 attached to the other end of the optical fiber array 108 to the corresponding photodetectors on the photonic die 106. Alternatively, optical signals received from the light source die 104 can be coupled through the fiber-to-chip grating couplers 118 to the optical fiber array 108 which can be further transmitted to the remote server.

Figure 2:
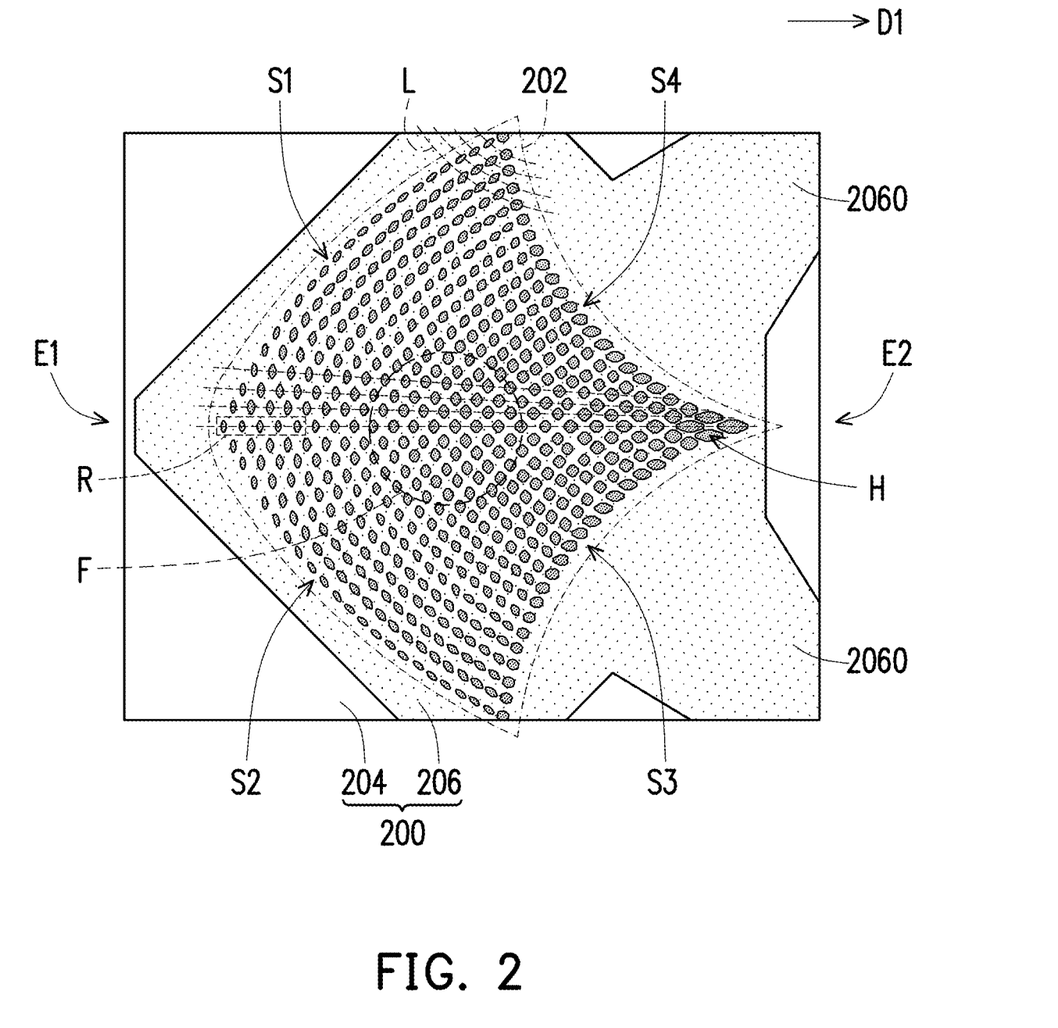
FIG. 2 illustrates a partial top view of an exemplary grating coupler, in accordance with some embodiments of the present disclosure.
Figure 3:
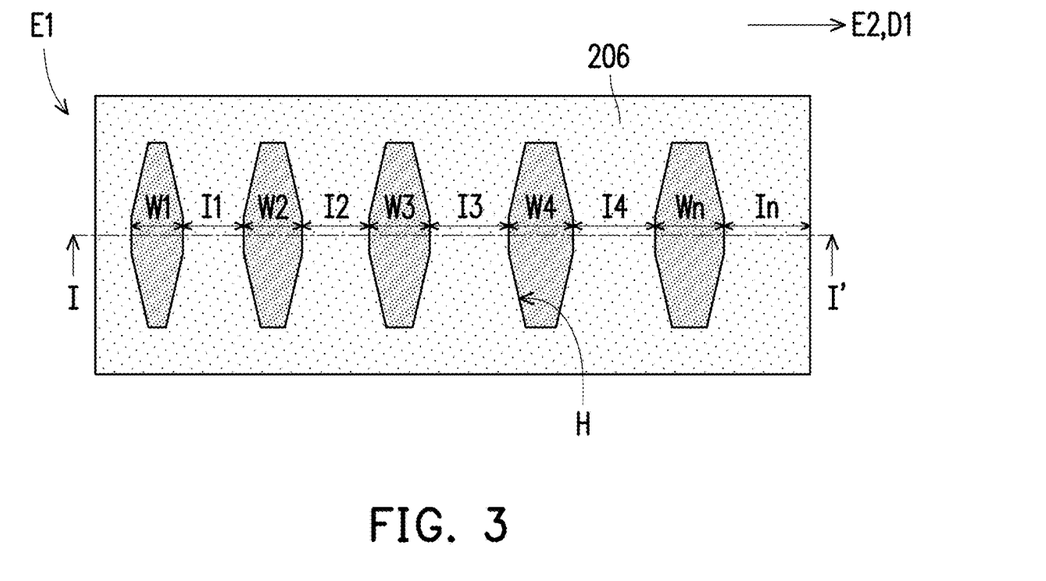
FIG. 3 illustrates an enlarged top view of a region R in FIG. 2.
Figure 4:
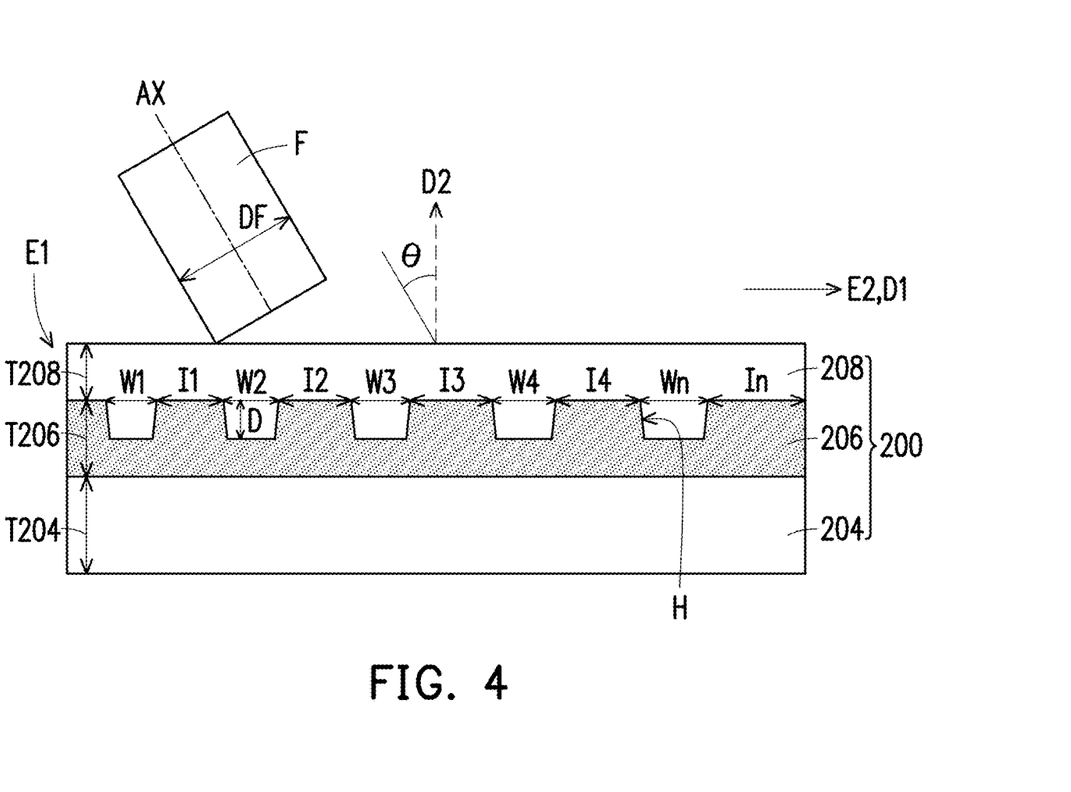
FIG. 4 illustrates a cross-sectional view of an exemplary grating coupler along line I-I' in FIG. 3.

FIG. 2 illustrates a partial top view of an exemplary grating coupler 200 (can also be referred to as "fiber-to-chip grating coupler"), in accordance with some embodiments of the present disclosure. FIG. 3 illustrates an enlarged top view of a region R in FIG. 2. FIG. 4 illustrates a cross-sectional view of an exemplary grating coupler along line I-I' in FIG. 3.

Referring to FIGS. 2 to 4, the grating coupler 200 may include a substrate 204 and a core layer 206 disposed on the substrate 204. The core layer 206 may be made of a material having a higher refractive index than that of the material of the substrate 204. For example, the material of the substrate 204 includes silicon oxide, and the material of the core layer 206 includes silicon. In some embodiments, the material of the substrate 204 can be replaced by other types of dielectric materials, such as Si, Si3N4, SiO2 (e.g., quartz or glass), Al2O3, and H2O, according to various embodiments of the present disclosure. In some embodiments, the substrate 204 includes a silicon substrate and a silicon oxide layer, which can be fabricated on the silicon substrate using chemical vapor deposition, physical vapor deposition, etc. In some embodiments, a thickness (e.g., a maximum thickness) T204 of the substrate 204 is larger than or equal to 500 nm and smaller than or equal to 3000 nm. In some embodiments, the core layer 206 is formed on the substrate 204 using chemical vapor deposition. In some embodiments, a maximum thickness T206 of the core layer 206 is larger than or equal to 250 nm and smaller than or equal to 350 nm.

The core layer 206 includes a plurality of holes H located in an optical coupling region 202 of the grating coupler 200. The optical coupling region 202 is the region of the grating coupler 200 where light is redirected from an optical fiber into other components (e.g., photodetectors), or vice versa. In some embodiments, the plurality of holes H are formed through an etching step. The deeper the etching depth or the larger the etching range, the more the core layer 206 is removed, and the lower the effective refractive index of the core layer 206. In the illustrated embodiment, as shown in FIGS. 3 and 4, the plurality of holes H have the same depth D, and in a cross-section plane (as shown in FIG. 4) perpendicular to the substrate 204 and passing through both a first end E1 of the optical coupling region 202 and a second end E2 of the optical coupling region 202, widths (e.g., maximum widths, denoted by W1, W2, W3, . . . , Wn) and intervals (e.g., maximum intervals, denoted by I1, I2, I3, . . . , In) of the plurality of holes H gradually increase from the first end E1 to the second end E2, and thus the effective refractive index of the core layer 206 gradually decrease from the first end E1 to the second end E2.

In some embodiments, a maximum depth (the depth D) of each of the plurality of holes H is larger than or equal to 70 nm and smaller than or equal to 270 nm. In some embodiments, the widths (e.g., W1, W2, W3, . . . , Wn) of the plurality of holes H are larger than or equal to 100 nm and smaller than or equal to 1000 nm. In some embodiments, the intervals (e.g., I1, I2, I3, . . . , In) of the plurality of holes H are larger than or equal to 200 nm and smaller than or equal to 500 nm. In some embodiments, pitches (e.g., W1+I1, W2+I2, . . . , Wn+In) of the plurality of holes H are larger than or equal to 300 nm and smaller than or equal to 800 nm, according to various embodiments of the present disclosure, such as for near infrared (NIR) waveband (e.g., wavelength in a range of 1260 nm to 1625 nm) application.

In the illustrated embodiment, as shown in FIG. 2, the grating coupler 200 is, for example, a polarization splitting grating coupler (PSGC), and the optical coupling region 202 is adapted to couple an optical fiber array (one optical fiber F is schematically shown in FIGS. 2 and 4) and an optical detector (e.g., a photodetector, not shown). The core layer 206 has two output portions 2060 spaced apart from each other and located on the second end E2 of the optical coupling region 202. Each of the two output portions 2060 serves as a waveguide and is connected between the optical coupling region 202 and a corresponding optical detector to facilitate optical signal transmission. The plurality of holes H are configured in a quadrilateral array having two convex sides (e.g., convex sides S1 and S2) adjacent to the first end E1 and two concave sides (e.g., concave sides S3 and S4) adjacent to the second end E2 and facing the two output portions 2060.

In the illustrated embodiment, the plurality of holes H are arranged along a plurality of lines L (also referred to as "arrangement paths" of the plurality of holes H; eight lines L are schematically shown in FIG. 2) extending from the first end E1 to the second end E2. Widths and intervals of the holes H arranged along the same line L gradually increase from the first end E1 to the second end E2, as shown in FIGS. 3 and 4. It is noted that the plurality of lines L are virtual lines that not visible in the optical coupling region 202. In the illustrated embodiment, the plurality of lines L have different curvatures or with gradual curvature variation. Specifically, the curvature of the line L in the middle equals to zero (a straight line), and the curvature of the line L increases as the distance of the holes H on the line L to the middle line L increases. Further, a shape of each of the plurality of holes H in a top view of the grating coupler 200 is octagonal, wherein the long axis of each of the holes H located near the first end E1 is perpendicular to a direction D1 pointing from the first end E1 to the second end E2, and the long axis of each of the holes H located near the second end E2 is parallel to the direction D1 so as to facilitate optical signal transmission. However, any numbers of holes H in the grating coupler 200, the arrangement of the holes H in the optical coupling region 202, the shape of the optical coupling region 202, or the shape of each of the plurality of holes H in the top view of the grating coupler 200 can be used and are within the scope of the present disclosure. For example, in other embodiments, the shape of each of the plurality of holes H in the top view of the grating coupler 200 can be a circle, an ellipse, a petal shape or other polygons.

In some embodiments, the grating coupler 200 may further include a cladding layer 208 disposed on the core layer 206 and filled in the plurality of holes H. The cladding layer 208 may be made of a material having a lower refractive index than that of the material of the core layer 206. For example, the material of the cladding layer 208 includes silicon oxide, and a thickness T208 (from the top surface of the cladding layer 208 to the top surface of the core layer 206) thereof is larger than or equal to 0.6 μm and smaller than or equal to 3 μm according to various applications. In some embodiments, the cladding layer 208 can be made of other types of dielectric materials according to different applications, including polycrystalline silicon and silicon nitride. In some other embodiments, the cladding layer 208 includes a plurality of layers with graded indices (e.g., the refractive index of the layers in the cladding layer 208 increases). In some embodiments, the thickness of the plurality of layers can be individually adjusted according to various applications. It should be noted that this is merely an example and optimized thickness of the cladding layer 208 is a function of its effective index (i.e., material properties) in combination with the grading structure underneath. Therefore, any thickness of the cladding layer 208 can be used to achieve optimized coupling efficiency at desired wavelengths and are within the scope of the present disclosure.

In some embodiments, the grating coupler 200 may further include a top reflection layer (not shown) disposed on the cladding layer 208 and exposing at least a portion of the optical coupling region 202 and a bottom reflection layer (not shown) disposed below the substrate 204 (e.g., a silicon oxide layer). In some embodiments, a material of the top reflection layer or the bottom reflection layer includes Al, Cu, Ni, and a combination of at least two of the above. In some embodiments, a thickness of the top reflection layer or the bottom reflection layer is larger than or equal to 0.1 μm and smaller than or equal to 10 μm.

In some embodiments, the radiated optical field from an optical fiber F with a core diameter DF is collected by the grating coupler 200. In one example, the core diameter DF is less than 10 μm. In some embodiments, the optical fiber F receives the optical field (optical signals) at an angle θ (between an axis AX of the optical fiber F and a direction D2 perpendicular to the substrate 204). In some embodiments, the angle θ is larger than or equal to 5 degrees and smaller than or equal to 15 degrees according to the structural/geometric/materials properties of the grating coupler 200 and the cladding layer 208. In some embodiments, the optical fiber F can be a single mode fiber or a multimode fiber.

Figure 5:
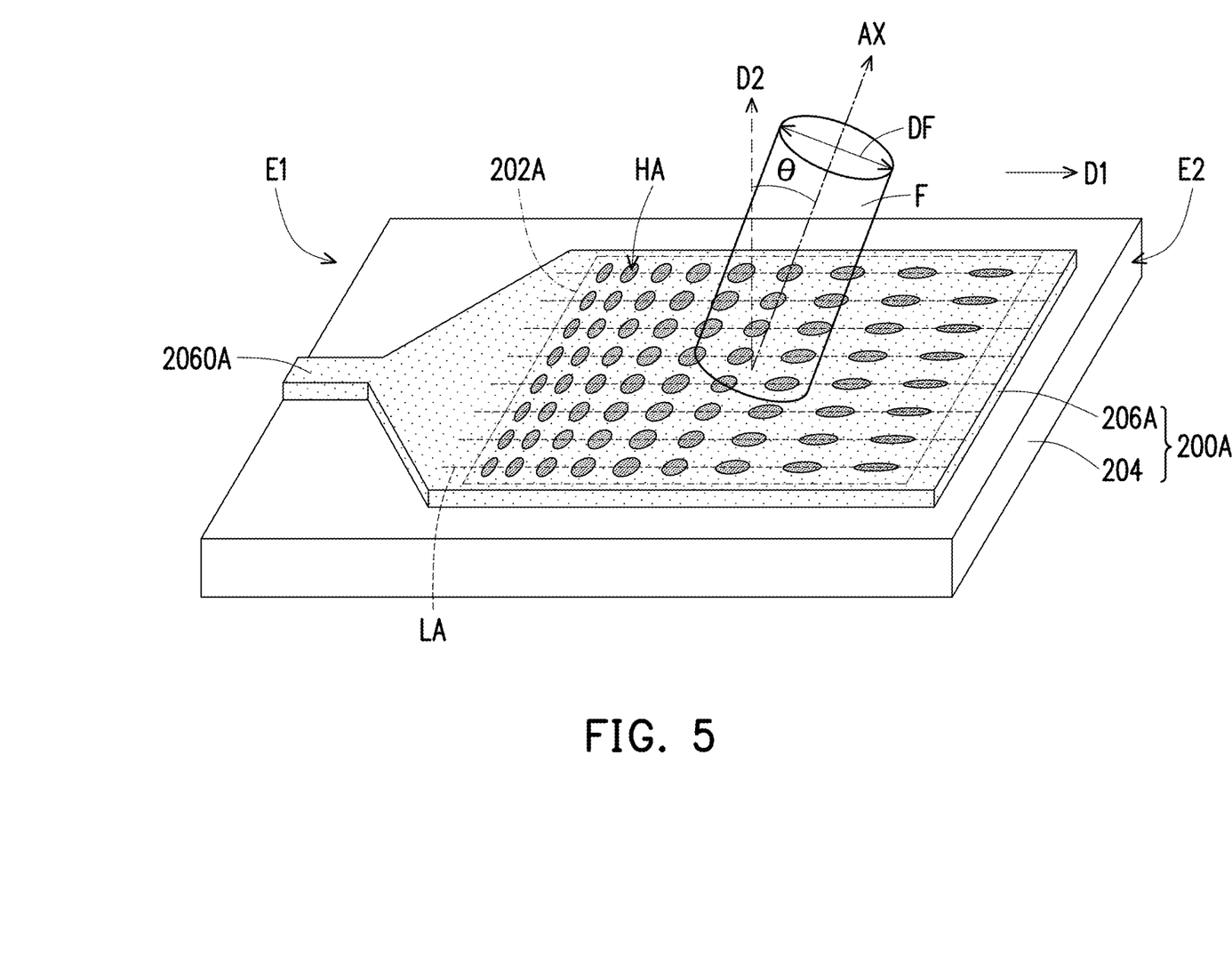
FIG. 5 illustrates a schematic view of another exemplary grating coupler, in accordance with some embodiments of the present disclosure.

FIG. 5 illustrates a schematic view of another exemplary grating coupler 200A, in accordance with some embodiments of the present disclosure. Referring to FIG. 5, the grating coupler 200A is, for example, a single polarization grating coupler (SPGC), an optical coupling region 202A of the grating coupler 200A is adapted to couple an optical fiber array (one optical fiber F is schematically shown in FIG. 5) and an optical component (e.g., a light source or a photodetector located on the first end E1 of the optical coupling region 202A, not shown), and the radiated optical field from the grating coupler 200A is collected by the optical fiber F with the core diameter DF.

The grating coupler 200A includes the substrate 204 and a core layer 206A. The core layer 206A includes a rectangular-shaped portion located in the optical coupling region 202A, and the rectangular-shaped portion includes a plurality of holes HA configured in a rectangular-shaped array. Specifically, the plurality of holes HA are arranged along a plurality of lines LA (eight lines LA are schematically shown in FIG. 5) extending from the first end E1 to the second end E2. In the illustrated embodiment, the plurality of lines LA are straight virtual lines parallel to each other. Specifically, each of the plurality of lines LA extends along direction D1. Further, widths and intervals of the holes HA arranged along the same line LA gradually increase from the first end E1 to the second end E2. In the illustrated embodiment, a shape of each of the plurality of holes HA in a top view of the grating coupler 200A is an ellipse, wherein the long axis of each of the holes HA located near the first end E1 is perpendicular to the direction D1, and the long axis of each of the holes HA located near the second end E2 is parallel to the direction D1. However, any numbers of holes HA in the grating coupler 200A, the arrangement of the holes HA in the optical coupling region 202A, the shape of the optical coupling region 202A, or the shape of each of the plurality of holes HA in the top view of the grating coupler 200A can be used and are within the scope of the present disclosure. For example, in other embodiments, the shape of each of the plurality of holes HA in the top view of the grating coupler 200A can be a circle, a petal shape or other polygons.

In the illustrated embodiment, the core layer 206A further includes a waveguide 2060A located on the first end E1, and the radiated optical field from the light source (not shown) is transmitted to the optical coupling region 202A through the waveguide 2060A and then collected by the optical fiber F. In this case, the first end E1 serve as a signal-input end.

In some alternative embodiments, the optical coupling region 202A of the grating coupler 200A is adapted to transmit an optical signal from the outside (e.g., from the optical fiber F or the environment) to an optical component (e.g., a photodetector, not shown) located next to the waveguide 2060A. In this case, the first end E1 serve as a signal-output end.

In some embodiments, the grating coupler 200A further includes the cladding layer 208 (see FIG. 4), the top reflection layer, and the bottom reflection layer as described above. Other embodiments in the disclosure can also be changed accordingly, and will not be repeated below.

Figure 6:
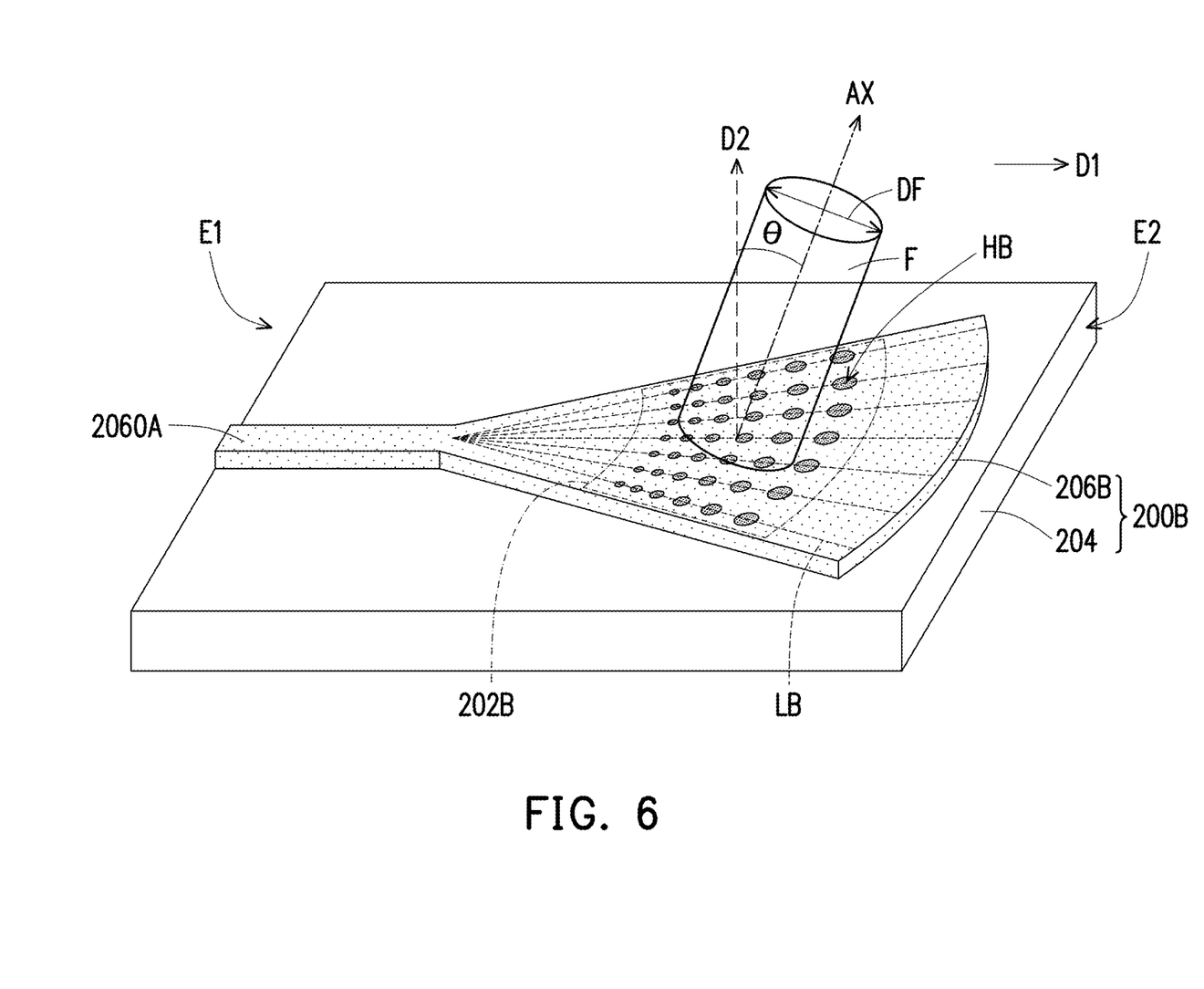
FIG. 6 illustrates a schematic view of yet another exemplary grating coupler, in accordance with some embodiments of the present disclosure.

FIG. 6 illustrates a schematic view of yet another exemplary grating coupler 200B, in accordance with some embodiments of the present disclosure. Referring to FIG. 6, the main difference between the grating coupler 200B and the grating coupler 200A in FIG. 5 is described below. In the grating coupler 200B, a core layer 206B includes a fan-shaped portion located in the optical coupling region 202B, and the fan-shaped portion includes a plurality of holes HB configured in a fan-shaped array. Specifically, the plurality of holes HB are arranged along a plurality of lines LB (seven lines LB are schematically shown in FIG. 6) extending from the first end E1 to the second end E2. In the illustrated embodiment, the plurality of lines LB are straight virtual lines intersecting each other. Further, widths and intervals of the holes HB arranged along the same line LB gradually increase from the first end E1 to the second end E2. In the illustrated embodiment, a shape of each of the plurality of holes HB in a top view of the grating coupler 200A is a circle. However, any numbers of holes HB in the grating coupler 200B, the arrangement of the holes HB in the optical coupling region 202B, the shape of the optical coupling region 202B, or the shape of each of the plurality of holes HB in the top view of the grating coupler 200B can be used and are within the scope of the present disclosure. For example, in other embodiments, the shape of each of the plurality of holes HB in the top view of the grating coupler 200B can be an ellipse, a petal shape or other polygons.

Figure 7:
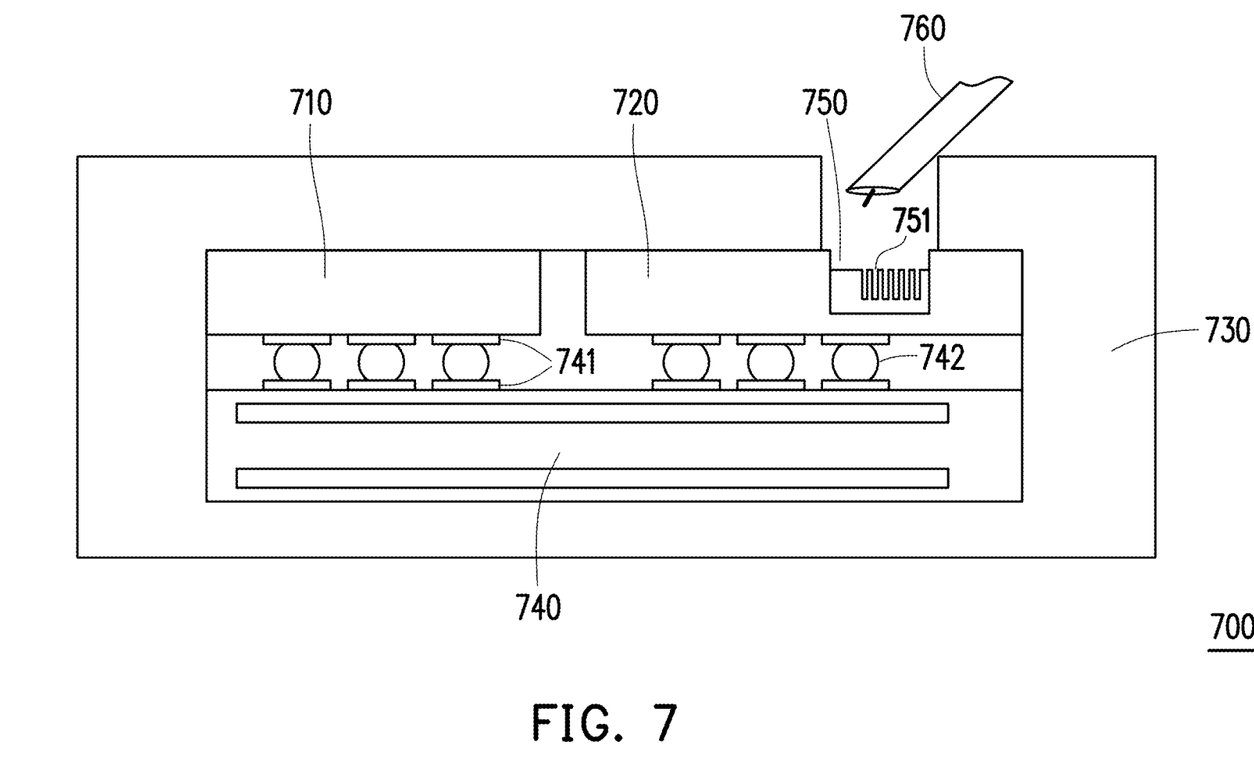
FIG. 7 illustrates a cross-sectional view of a system for communication, in accordance with some embodiments of the present disclosure.

FIG. 7 illustrates a cross-sectional view of a system for communication, in accordance with some embodiments of the present disclosure. Referring to FIG. 7, the system for communication is, for example, located inside an optical device 700. The system for communication includes an electronic die 710 and a photonic die (e.g., a semiconductor photonic die) 720 that are connected via an interposer (also referred to as "substrate") 740, through bumps 742 and pads 741. The electronic die 710, the photonic die 720 and the interposer 740 are covered by package material 730 which has an opening on top of a trench 750 of the photonic die 720. The system for communication further includes a grating coupler 751 located in the trench 750 for transmitting optical signals between the photonic die 720 and an optical fiber array 760 attached to the photonic die 720. The grating coupler 751 here serves as an optical input/output (I/O) device for the optical device 700.

According to some embodiments, the grating coupler 751 is configured for receiving optical signals from the optical fiber array 760 at an angle that is measured between an axis of the optical fiber array 760 and a direction perpendicular to the interposer 740. According to various embodiments, the angle of the optical fiber array 760 is adjustable between 5 and 15 degrees. The fiber angle may be modified to improve coupler efficiency of the grating coupler 751. The design of the grating coupler 751 may refer to the embodiments described above, and will not be repeated here. In some embodiments, the grating coupler design described above helps to enhance the coupling efficiency up to more than 50% for optical signal having wavelength around 1290 nm.

Based on the above discussions, it can be seen that the present disclosure offers various advantages. It is understood, however, that not all advantages are necessarily discussed herein, and other embodiments may offer different advantages, and that no particular advantage is required for all embodiments.

In accordance with some embodiments of the disclosure, an apparatus for optical coupling has an optical coupling region and includes a substrate and a core layer disposed on the substrate. The core layer includes a plurality of holes located in the optical coupling region. An effective refractive index of the core layer gradually decrease from a first end of the optical coupling region to a second end of the optical coupling region.

In accordance with some embodiments of the disclosure, an apparatus for optical coupling has an optical coupling region and includes a substrate and a core layer disposed on the substrate. The core layer includes a plurality of holes located in the optical coupling region. The plurality of holes are arranged along a plurality of lines extending from a first end of the optical coupling region to a second end of the optical coupling region. Widths and intervals of the holes arranged along the same line gradually increase from the first end to the second end.

In accordance with some embodiments of the disclosure, a system for communication includes a semiconductor photonic die on a substrate, an optical fiber array attached to the semiconductor photonic die, and at least one grating coupler. The semiconductor photonic die includes at least one trench. The at least one grating coupler is in the at least one trench for transmitting optical signals between the semiconductor photonic die and the optical fiber array. The at least one grating coupler includes a core layer. The core layer includes a plurality of holes located in an optical coupling region of the grating coupler. An effective refractive index of the core layer gradually decrease from a first end of the optical coupling region to a second end of the optical coupling region. A non-zero angle is formed between an axis of the optical fiber array and a direction perpendicular to the substrate.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An apparatus for optical coupling, having an optical coupling region and comprising:
    a core layer comprising a plurality of holes separated from each other and located in the optical coupling region,
    wherein the plurality of holes are arranged along a plurality of lines extending from a first end of the optical coupling region to a second end of the optical coupling region,
    wherein lines among the plurality of lines adjacent to a central portion of the optical coupling region are straight lines,
    wherein lines among the plurality of lines adjacent to a peripheral portion of the optical coupling region are curved lines, and
    wherein in a cross-section plane perpendicular to the substrate and passing through both the first end and the second end, widths and intervals of the plurality of holes gradually increase from the first end to the second end.

2. The apparatus for optical coupling as claimed in claim 1, wherein the plurality of holes have the same depth.

3. The apparatus for optical coupling as claimed in claim 1, wherein a material of the core layer comprises silicon.

4. The apparatus for optical coupling as claimed in claim 1, wherein a maximum thickness of the core layer is larger than or equal to 250 nm and smaller than or equal to 350 nm.

5. The apparatus for optical coupling as claimed in claim 1, wherein a maximum depth of each of the plurality of holes is larger than or equal to 70 nm and smaller than or equal to 270 nm.

6. The apparatus for optical coupling as claimed in claim 1, wherein the widths of the plurality of holes are larger than or equal to 100 nm and smaller than or equal to 1000 nm.

7. The apparatus for optical coupling as claimed in claim 1, wherein intervals of the plurality of holes are larger than or equal to 200 nm and smaller than or equal to 500 nm.

8. The apparatus for optical coupling as claimed in claim 1, wherein pitches of the plurality of holes are larger than or equal to 300 nm and smaller than or equal to 800 nm.

9. The apparatus for optical coupling as claimed in claim 1, further comprising:
    a cladding layer disposed on the core layer and filled in the plurality of holes.

10. The apparatus for optical coupling as claimed in claim 1, wherein intervals of the plurality of holes gradually increase from the first end to the second end.

11. The apparatus for optical coupling as claimed in claim 1, further comprising:
    a substrate on which the core layer is disposed.

12. An apparatus for optical coupling, having an optical coupling region and comprising:
    a core layer comprising a plurality of holes separated from each other and located in the optical coupling region,
    wherein the plurality of holes are arranged along a plurality of lines,
    wherein the plurality of lines are parallel lines extending along a first direction pointing from a first end of the optical coupling region to a second end of the optical coupling region,
    wherein the plurality of lines are arranged along a second direction perpendicular to the first direction, and
    wherein in a cross-section plane perpendicular to the substrate and passing through both the first end and the second end, widths and intervals of the holes increase from the first end to the second end.

13. The apparatus for optical coupling as claimed in claim 12, wherein a maximum thickness of the core layer is larger than or equal to 250 nm and smaller than or equal to 350 nm.

14. The apparatus for optical coupling as claimed in claim 12, wherein a maximum depth of each of the plurality of holes is larger than or equal to 70 nm and smaller than or equal to 270 nm.

15. The apparatus for optical coupling as claimed in claim 12, wherein the plurality of lines are straight virtual lines.

16. An apparatus for optical coupling, having an optical coupling region and comprising:
    a core layer comprising a plurality of holes separated from each other and located in the optical coupling region,
    wherein the plurality of holes are arranged along a plurality of lines extending from a first end of the optical coupling region to a second end of the optical coupling region,
    wherein the plurality of lines converge near the first end and diverge near the second end, and
    wherein in a cross-section plane perpendicular to the substrate and passing through both the first end and the second end, widths and intervals of the holes increase from the first end to the second end.

17. The apparatus for optical coupling as claimed in claim 16, wherein a maximum thickness of the core layer is larger than or equal to 250 nm and smaller than or equal to 350 nm.

18. The apparatus for optical coupling as claimed in claim 16, wherein a maximum depth of each of the plurality of holes is larger than or equal to 70 nm and smaller than or equal to 270 nm.

19. The apparatus for optical coupling as claimed in claim 16, wherein the plurality of lines are straight virtual lines.

20. The apparatus for optical coupling as claimed in claim 16, wherein the widths of the plurality of holes are larger than or equal to 100 nm and smaller than or equal to 1000 nm.

\* \* \* \* \*